June 3, 1924.
H. TIEDEMANN
IMPULSE COUPLING
Filed Sept. 1, 1920
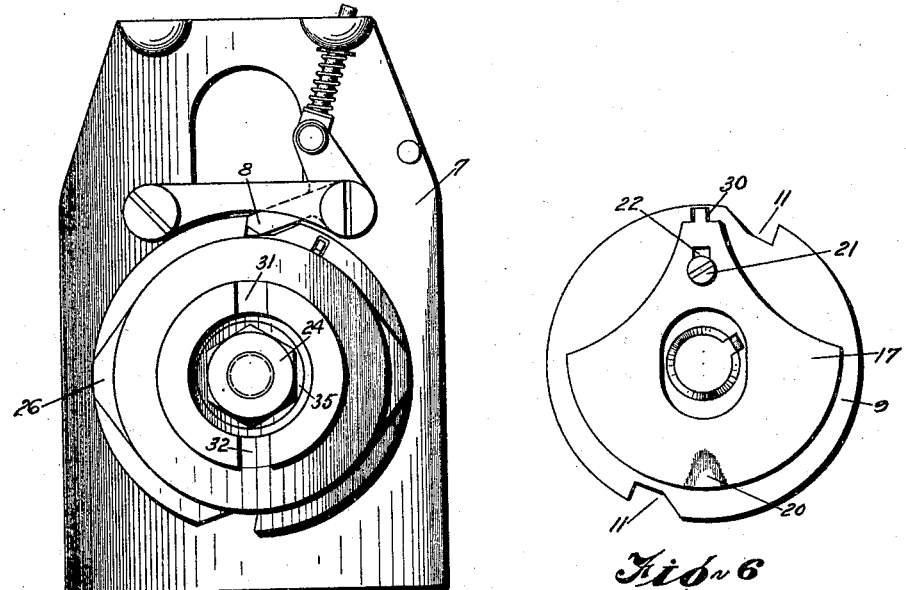
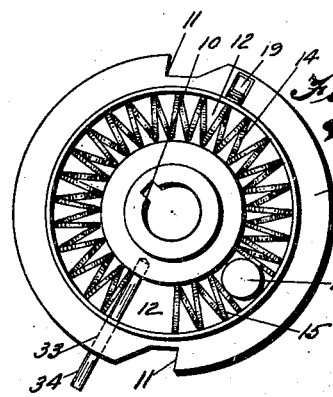
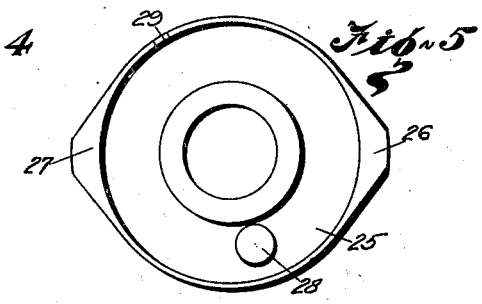
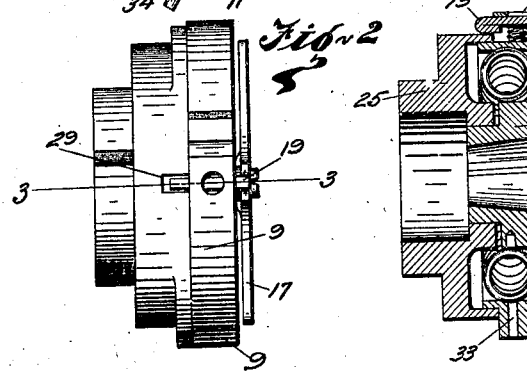
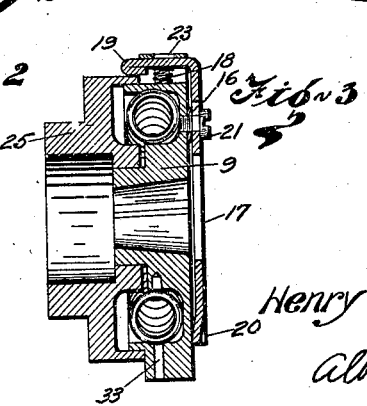
INVENTOR
Henry Tiedemann
BY
Albion D. T. Libby
ATTORNEY Patented June 3, 1924.

1,496,566

UNITED STATES PATENT OFFICE.

HENRY TIEDEMANN, OF NEWARK, NEW JERSEY, ASSIGNOR TO SPLITDORF ELECTRICAL COMPANY, OF NEWARK, NEW JERSEY.

IMPULSE COUPLING.

Application filed September 1, 1920. Serial No. 407,526.

*To all whom it may concern:*

Be it known that I, HENRY TIEDEMANN, a citizen of the United States, residing at Newark, in the county of Essex, State of New Jersey, have invented certain new and useful Improvements in Impulse Couplings, of which the following is a description, reference being had to the accompanying drawing, and to the figures of reference marked thereon.

In starting internal combustion engines, particularly where they are not equipped with special cranking devices, the rotative speed is usually very low at the time when the engine is going over compression, which is the time for firing the engine. This low rotative speed is detrimental to getting a good spark from an ignition generator of the magneto type. In order to rotate the rotor of the magneto at a high angular velocity, even though the angular velocity of the crank shaft is low, so called impulse couplings have been provided as described in the patent to Hermann dated October 7, 1919, and bearing No. 1,318,206, and to prevent any lag between the drive shaft and the magneto shaft during the normal operation of the magneto, automatic means have been provided to lock the two relatively rotative portions of the impulse coupling together, as described in the patent to Martin 1,318,218, October 7, 1919.

Among other objects as will be apparent, one object of this invention is to improve the automatic locking means so as to make the entire impulse coupling simpler in construction and easier to manufacture and the invention consists in the novel construction, combination and arrangement of parts as herein described, illustrated and claimed.

In the accompanying drawings, in which similar reference characters denote similar parts in the various views:

Figure 1 is a view of my impulse coupling as it appears in association with its supporting plate.

Figure 2 is an end view of my impulse coupling, per se.

Figure 3 is a section on the line 3—3 of Figure 2.

Figure 4 is a plan view of the driven member of my coupling.

Figure 5 is a plan view of the drive member of my coupling, and

Figure 6 is a back view of the driven member.

Now going into detail, my impulse coupling is associated with a plate 7 upon which is mounted a locking pawl 8 adapted to co-operate with a driven member 9 suitably apertured at its center and provided with a keyway 10 for the securing of this member in non-rotational engagement with the shaft of the magneto. Suitable diametrically opposed notches 11 are provided for engagement with the pawl 8 as has been clearly explained and explicitly described in the patent to Hermann, cited above. Within an annular recess 12 in said driven member there is a stop pin 13 and seated within the recess and abutting the stop pin, there are a compression spring 14 and a cushion spring 15. On the back of the driven member, and suitably spaced therefrom in non-frictional engagement therewith by means of a spacing washer 16 is a detent plate 17 normally urged in one direction by a weak compression spring 18 pressing against a turned over portion 19 of the detent plate, said turned over portion acting as a detent as will be explained hereinafter. At its lower end the plate 17 is fluted so as to space the plate from the back of the driven member and the end is so shaped as to make it heavier than the detent carrying end. To loosely secure the plate 17 to the driven member and to permit it to have longitudinal motion with respect thereto, a screw 21 is passed through a slot 22 in the plate and is screwed into the driven member. The plate is suitably apertured to permit transverse movement with respect to the magneto shaft. A hole 23 is countersunk in the driven member to permit the insertion and retention of the spring 18.

Co-operating with the driven member and telescopically engaged therewith is an annularly recessed drive member 25 provided with two cams 26 and 27 on its outer wall and with an operating pin 28 in the recess. The outer wall is slotted at 29, which in the normal position of the two members of the coupling, aligns with a slot 30 in the driven member, through which the detent 19 passes.

The drive member on its back is provided with a pair of slots 31, 32 for suitable connection with a drive coupling.

To facilitate assembly of the parts, the driven member is provided with a radial aperture 33 through which a pin 34 may temporarily be passed. In assembling the coupling, the spring 15 is snapped into place, the spring 14 is placed so that one end abuts the stop pin 13 while the other end engages the temporary assembling pin 34. Then by pressing against the central portion of the spring radially and toward the center, the spring may be snapped into place. The drive member is then telescoped on the driven member with the pin 28 between the pin 34 and the free end of the spring 15, and then the pin 34 is removed. The whole is then secured to the magneto shaft by means of a washer 35 and nut 24.

The operation of the device is as follows:

The coupling members normally are so positioned by the spring 14, that the slot 29 and slot 30 are aligned. The detent 19 however does not engage the slot 29 as the spring 18 normally urges the detent and the plate 17 to its non-engaging position. When the engine is cranked, the coupling is rotated as a unit until the dog 8 engages one of the notches 11. Further rotation of the engine causes the drive member 25 to rotate on the driven member 9 and causes it to compress the spring 14. This rotation and compression continues until one of the cams 26 or 27 engages the pawl 8 and releases it from the notch 11. Thereupon the force of the spring 14 immediately acts upon the driven member to rotate the same at approximately high engine speed. Just as soon as this occurs, the plate 17 through the centrifugal force throws the detent 19 into engagement with the periphery of the drive member, and as the same is rotated to its normal position with relation to the driven member, the two slots 29 and 30 align themselves, the detent 19 snaps into the slot 29 and thus the two members are locked together. This is the relative position of the parts while the magneto is being rotated at engine speed. When the engine stops the detent 19 is forced out of the slot 29 and the parts are then ready for another complete cycle of operation.

Having thus described my invention what I claim is:

1. An impulse starter comprising two coupling members rotatable with respect to one another, a pawl external to said members operable to hold one of the members in fixed position, cams on the other member to release said pawl after a predetermined degree of rotation thereof, means separate from said cam carrying member for normally yieldingly holding the members in a fixed relationship and operable upon the release of the pawl to quickly bring said members to their normal relationship, apertures in said members aligned in the normal relationship of the parts and a one-piece slidable detent operable by centrifugal force to engage said apertures to securely lock the members against relative rotation.

2. An impulse starter comprising two coupling members rotatable with respect to one another, a pawl external to said members operable to hold one of the members in fixed position, means on the other member to release said pawl after a predetermined degree of rotation thereof, means normally yieldingly holding the members in a fixed relationship and operable upon the release of the pawl to quickly bring said members to their normal relationship, an elongated aperture in one of said members, an opening in the side wall of the other member aligned in the normal relationship of the parts and a centrifugally operable detent member comprising a plate slidably arranged on the apertured member and having a detent member extending through the aperture in said member and engaging the opening in the other member to securely lock the members against relative rotation.

3. An impulse starter comprising two coupling members rotatable with respect to one another, a pawl external to said members operable to hold one of the members in fixed position, means on the other member to release said pawl after a predetermined degree of rotation thereof, means normally yieldingly holding the members in a fixed relationship and operable upon the release of the pawl to quickly bring said members to their normal relationship, an elongated aperture in one of said members, an opening in the side wall of the other member aligned in the normal relationship of the parts and a centrifugally operable detent member comprising a plate slidably arranged on the apertured member and having a detent member extending through the aperture in said member and engaging the opening in the other member to securely lock the members against relative rotation, said plate being non-frictionably spaced from said apertured member by means of a washer and screw passing through a slot at one end of said member and by a fluted portion struck out from said member at the other end thereof.

4. An impulse coupling comprising a driven member and a drive member, yielding means normally holding said members in a fixed relationship with respect to one another, aligned openings in said members, a centrifugally operable one-piece slidable detent mounted on the back of said driven member normally ineffective to engage both of said openings, means separate and independent of the detent on said driven member adapted to engage a stop so as to tension the yielding means upon initial rotation of the drive member, means on said drive member to trip said stop upon further rotation thereof, said yielding means then becoming effective to restore the driven member to its initial position with respect to the drive member, and said detent immediately thereafter engaging both of the said openings and becoming effective to lock said members together in non-rotative relationship.

In testimony whereof, I affix my signature.

HENRY TIEDEMANN.